DEAN B. CHENOWETH
RICHARD LOUIS BARNARD
INVENTORS

ATTORNEYS

March 17, 1970   D. B. CHENOWETH ETAL   3,500,610
APPARATUS FOR COATING AN ARTICLE WITH A LIQUID SUBSTANTIALLY
FREE FROM DISCRETE IMMISCIBLE MATTER
Original Filed Feb. 19, 1963   2 Sheets-Sheet 2
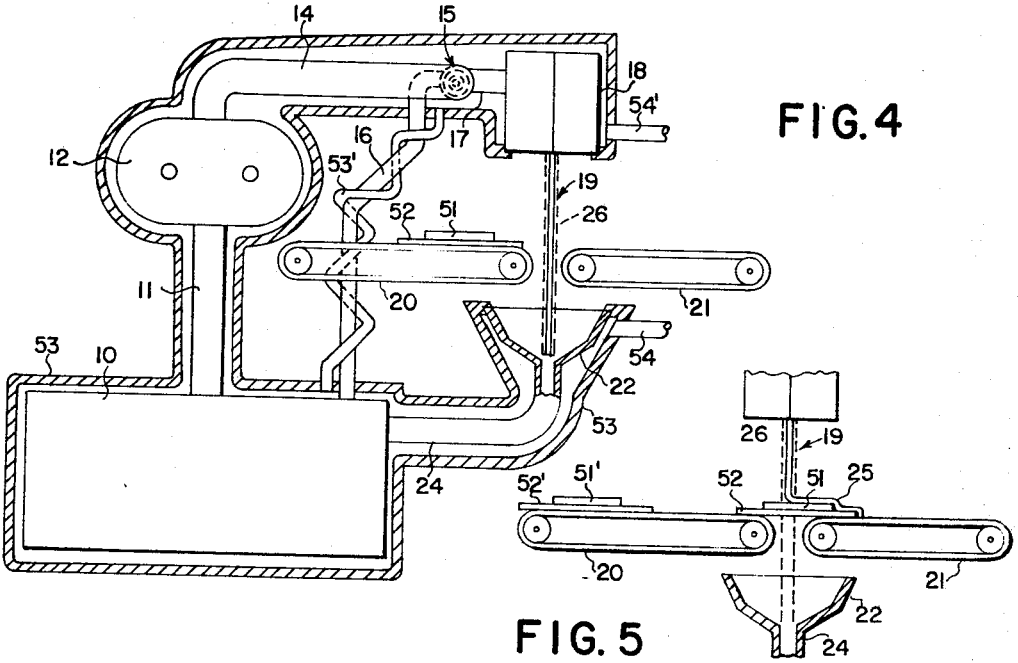
FIG. 4
FIG. 5
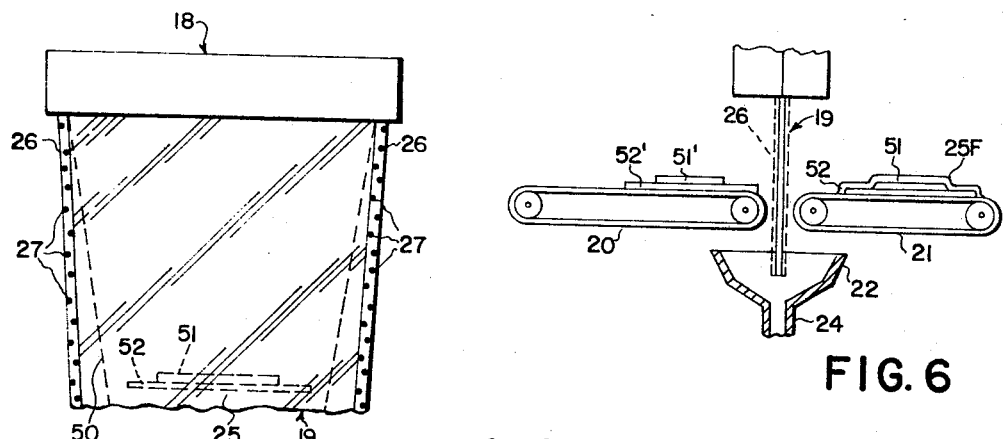
FIG. 6
FIG. 7
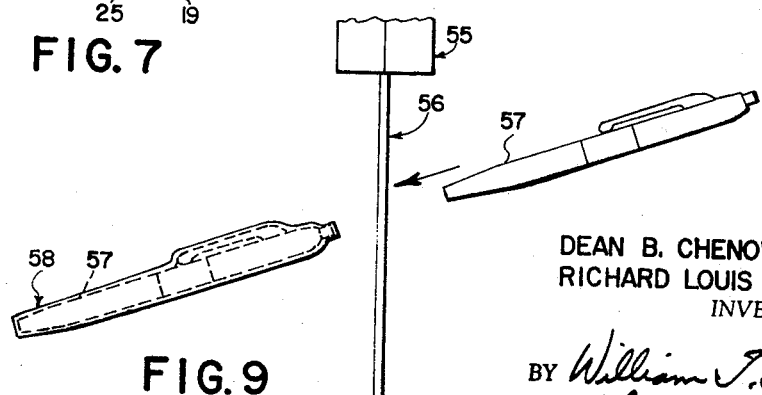
FIG. 9
DEAN B. CHENOWETH
RICHARD LOUIS BARNARD
INVENTORS
BY William T. French
Charles L. Good
ATTORNEYS United States Patent Office 3,500,610
Patented Mar. 17, 1970

3,500,610
APPARATUS FOR COATING AN ARTICLE WITH A LIQUID SUBSTANTIALLY FREE FROM DISCRETE IMMISCIBLE MATTER
Dean B. Chenoweth, Minneapolis, and Richard Louis Barnard, Wayzata, Minn., assignors, by mesne assignments, to Eastman Kodak Company
Application Feb. 19, 1963, Ser. No. 259,707, now Patent No. 3,299,195, dated Jan. 17, 1967, which is a continuation-in-part of application Ser. No. 178,128, Mar. 7, 1962. Divided and this application Jan. 16, 1967, Ser. No. 627,279
Int. Cl. B05b 13/02, 15/02; B05c 5/00
U.S. Cl. 53—140    2 Claims

ABSTRACT OF THE DISCLOSURE

Apparatus for curtain coating including means for removing contaminants from a viscous liquid coating composition and means, such as a nozzle, for projecting a falling curtain of the coating composition. The apparatus may also include as additional elements a conveying means for an article to be coated, a catch basin for that portion of the falling curtain not used for coating, a reservoir, and a pump for moving the viscous liquid from the reservoir to the projecting nozzle.

---

This application is a division of Chenoweth and Barnard U.S. Ser. No. 259,707, filed Feb. 19, 1963, now Patent No. 3,299,195, issued Jan. 17, 1967, Ser. No. 259,707 being in turn a continuation-in-part of U.S. Ser. No. 178,128, filed Mar. 7, 1962, now abandoned.

This invention relates to and provides a new and unusual apparatus for coating an article utilizing a substantially bubble free film. More particularly, this invention relates to apparatus for curtain coating an article including a means for removing contaminants from a viscous liquid coating composition and a nozzle for projecting the contaminant-free film ino a falling curtain through which the article to be coated can be passed.

Specifically, the structure for extracting gas bubbles from the liquid in which they are entrained includes at least one set of tubular conduits, one of which is smaller than and substantially concentrically positioned within the other and receives the liquid with the entrained bubbles as a result, it is thought, of their being concentrated according to the velocity gradient of the liquid flow within the larger tubular conduit in a relatively high speed, low shear area of flow near the center of the larger conduit while the peripheral portion of the liquid is slowed down and maintained at a higher shear stress as the result of friction between the liquid and the outer of the two tubes.

The apparatus also includes a clear film projecting apparatus having one or more velocity gradient bubble removing means and a nozzle for extruding or projecting a viscous liquid coating composition into a falling curtain. This nozzle may also include means for discharging residual bubble carrying liquid at spaced points in contact with the sides of a discharge film from which bubbles have been removed to serve as a means for holding this curtain or film in a stretched condition for a majority of its extension to a coating area. The structure of the invention also affords choke control means which permits maximum flow of clear liquid consistent with efficient bubble removal.

In operation the apparatus according to this invention will provide an article completely encapsulated in a seamless unbroken film and an article on a backing board secured to the backing board by having similar unbroken seamless film adhered to the board and covering the article on the side spaced from the board surface on which it rests. These films are commonly and preferably clear. These coated articles and the method for producing them is dependent on and made possible by the separation and film projecting apparatus described above. The method consists of projecting a film that is substantially wider than the article to be encapsulated or the board supporting the article to be covered and passing the same through the film while it is being projected. This may be done by any suitable powered or gravity conveyor selected from numerous conventional types available and which form part of this invention only in combination with other structure as defined in the claims hereafter.

Accordingly, it is an object of this invention to provide a new and useful coating device that projects a film substantially and consistently free from entrained bubbles.

A further object of this invention is to provide a coating structure that has a separating means having no parts that move while removal of entrained gas bubbles is taking place.

Yet another object of this invention is to provide a curtain coating apparatus that recirculates fluids of viscosities of 5000 centipoise and more, yet provides a bubble-free curtain.

Other and further objects of the invention reside in the specific structural features of the apparatus including the primary bubble extracting or separating means, the secondary separating means, the control of the flow therefor, the film generating structure associated therewith, and cooperating between the separating means and the film generating nozzle.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 4 is a diagrammatic representation of an entire film generating system employing the film or curtain projecting apparatus of FIGURES 1–3 with broken lines illustrating a bubble entrained column of curtain material and hidden parts;

FIGURE 5 is a fragmentary diagrammatic view showing an advanced position of an article to be coated, as it passes through the curtain of FIGURE 4;

FIGURE 6 is a view substantially identical to FIGURE 5 but illustrating a still further advanced position of an article that has passed through and been coated by the curtain of FIGURE 4;

FIGURE 7 is a front elevational view of the bottom part of the nozzle of the curtain or film projecting apparatus showing the curtain projecting therefrom;

Figure 8:
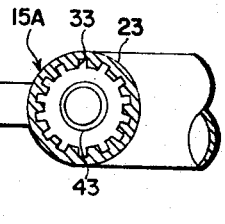

FIGURE 8 is a fragmentary sectional view of a modified form of structure of the instant invention; and FIGURE 9 is a composite view of the bottom part of the nozzle, a film protected thereby, an article approaching the curtain and the encapsulated article after having passed through the curtain; the article shown approaching the curtain is shown in fragment to conserve space and the scale used is that of FIGURES 4, 5 and 6.

Reference is now made to the drawings and first to FIGURE 4. The system is shown as comprising generally a reservoir 10 for containing fluid or coating material connected by a supply pipe or conduit 11 to a suitable pump 12. A discharge pipe or conduit 14 extends from the pump to a main or primary velocity gradient separator or bubble separating means generally designated 15. From this unit the separated or removed liquid with entrained bubbles enters the return pipe 16 and is discharged back into the reservoir 10. Another pipe 17 carrying liquid from which most of the entrained bubbles have been removed extends to a nozzle means including a secondary velocity gradient separator 18. Of course, it is to be understood that while it is preferred to re-use and recirculate the bubble-containing liquid which is removed, it is not necessary if cost is not considered. In such instance, pipe 16 (as well as pipe 24) can be connected to a waste receptacle.

From the nozzle means 18 a curtain or film 19 is projected downward between two suitable conveyors 20 and 21, which, as shown, are belt conveyors and have their top belt runs moving in the direction of the arrows. Between and below the two conveyors is the excess liquid or film material catch basin 22. It is connected by a suitable pipe such as 24 to the reservoir 10 so that any excess material may be returned to the reservoir for re-use normally or discarded as noted above.

As shown in FIGURE 7, and as later explained in more detail, the film or curtain 19 projected by nozzle means 18 actually consists of a center film portion 25 from which bubbles have been removed, and usually clear, engaged at each side by a column 26 of the same liquid having the residual entrained air or gas bubbles 27. Usually the column 26 has so many entrained air bubbles in it that it appears to be a foam-like material but the bubbles have been shown in the drawings as particulate bubbles.

Figure 2:
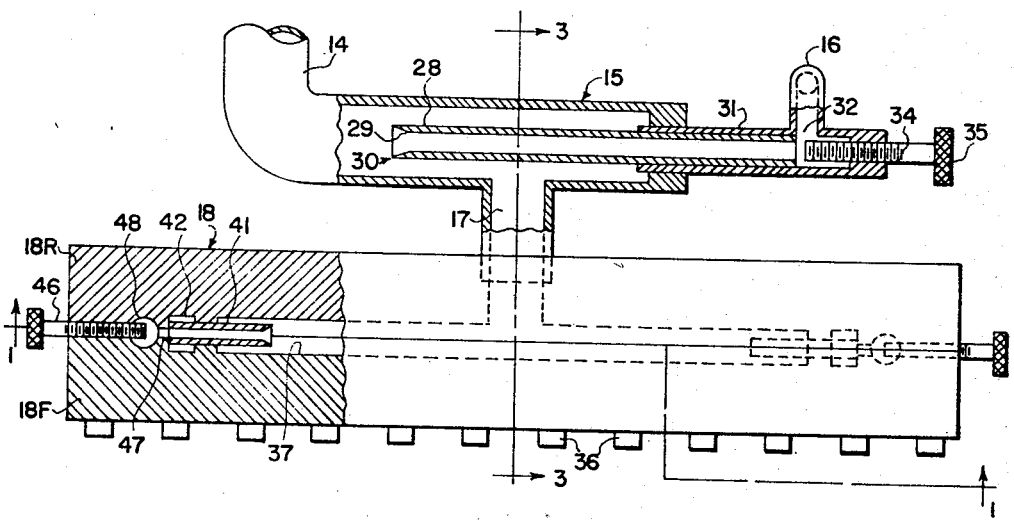
FIGURE 2 is a partial plan view, partial horizontal section of the apparatus of FIGURE 1 with hidden parts illustrated with broken lines.
Figure 3:
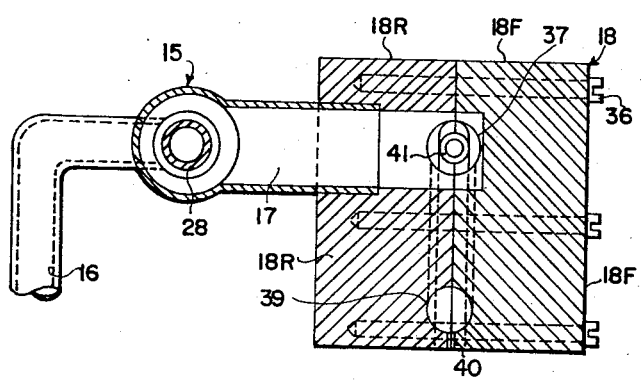
FIGURE 3 is a vertical section taken on the line 3—3 of FIGURE 2; broken lines illustrate hidden parts.

FIGURE 2 shows in more detail the structure of the primary bubbling removing means 15 and the secondary bubble separating means or nozzle means 18. In this figure, conduit 14 is shown positioned to supply liquid to the main bubble extracting means 15. Concentrically arranged within the main or outer conduit 14 is the inner bubble receiving tube or conduit 28, positioned to extend therein, as shown. It is preferably bevelled or chamfered on its inside free end as shown at 29 to provide a sharp division point as at 30 between the material entering tube 28 and that passing at the outside thereof.

Tube 28 is shown as pressed into and extending into the T-fixture 31 and terminates in a flat shoulder 32. Fixture 31 is in turn assembled in fluid-tight relation in the end of tube 14, as shown, which has its wall thickened at that point to receive the end of fixture 31. For example, it may be threaded into the fixture and turned by means of the knurled control knob 35. As will be appreciated, choke controls may be adjusted inwardly or outwardly (leftwardly or rightwardly with respect to FIGURE 2) to seat or unseat on shoulder 32 to control the amount of liquid removed through tube 28 as desired. Return pipe 16 may thus be wholly or partially connected to tube 28 by withdrawing the screw threaded control member 34 or pipe 16 can be cut off from tube 28 by advancing or screwing in the control member 34. The main flow of liquid material by-passes the pipe 28 and flows out through the connecting pipe 17 and into the nozzle means or secondary bubble separating means 18, which takes the form of a curtain projecting nozzle block. Pipe 17 should be large enough to avoid any substantial build-up of back pressure in conduit 14 and preferably at least as large as conduit 14 less the area occupied by the tube 28.

Conduits 14 and 28 will commonly take the form of tubes or pipes, etc., particularly when liquid is being pumped through a unit such as nozzle 18. While conduits 14 and 28 are shown as cylindrical in cross-section and both of the same cross-sectional shape, this is not necessary, although preferred. Thus, it is contemplated that conduits of rectangular or other cross-section may be used and that the cross-section of conduits 14 (or the main, larger conduit) need not be precisely the same in form as the cross-section of conduit 28 (the take-off or smaller conduit) although such identity of form is preferred. Likewise, when tubes are used, it is much preferred to place the inner tube concentrically with respect to the outer tube, some departure is acceptable and it may be only substantially concentrically positioned.

Figure 1:
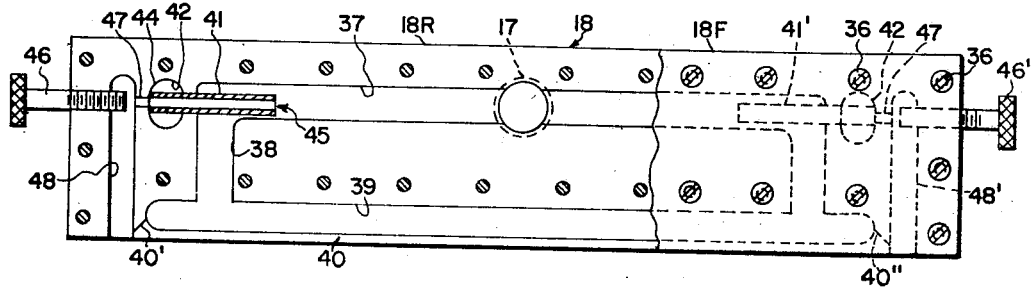
FIGURE 1 is a partial front elevation, partial vertical section of a film or curtain projecting nozzle structure or apparatus embodying the present invention with broken lines illustrating hidden parts.

Nozzle block 18 is shown as suitably made up from two cooperating portions designated 18R for the rear portion and 18F for the front portion. The two portions are tightly secured together in any suitable manner as by multiple closely space cap screws 36 as seen in FIGURE 1. Each of the two portions 18R and 18F of nozzle block 18 have a semi-circular upper milled channel 37 which together form a cylindrical conduit or tube and into which the feed pipe 17 connects. Near each end of the channels 37 are the milled channels 38 which connect to lower milled channels 39. Channels 38 and 39 also, in cooperation, form conduits. The bottom portions of milled channels 39 are relieved very slightly so that when the two blocks are clamped tightly together as by the screws 36, there is a thin slot 40 extending entirely across the bottom of the nozzle block 18 which slot is connected to the channels 39 and initiates the film that is projected by the nozzle.

At each end of the conduit formed by channels 37 is placed a bubble take-off tube, 41 and 41'. The bubble take-off tubes 41 and 41' terminate in chambers that are formed near the ends of the blocks and designated 42 and 42'. These chambers are milled in an oval pattern in order to provide flat outer sides 44, 44' against which the ends of bubble take-off tubes 41, 41' may abut flatly. This is a construction expedient and is not essential structure, it being necessary only that the tubes and conduits join. The inside ends of the bubble take-off tubes 41, 41' are also internally chamfered or bevelled to provide a sharp edge as at 45 for separating the liquid entering the tube from that passing around its exterior. Edge 45 is similar to edge 29 for tube 28.

Bubble take-off choke control members 46, 46' (similar to member 34) are screws threaded into the ends of the nozzle block 18 for the purpose of controlling the amount of material that flows through bubble take-off tubes 41, 41'. As in the case of the main bubble separating structure control member 34, these choke screws 46, 46' are threaded into the end of the block and have knurled knobs to facilitate turning to advance toward or retract the choke screws from the seats formed by block 18 at the ends of channels 47, 47' which cooperate to form a conduit communicating with the inside of bubble take-off tubes 41, 41'. The channels 47, 47' also communicate with vertically milled passages 48, 48' (again cooperating to form conduits) from each of which a stream of liquid having entrained air bubbles may be discharged in the same direction as the film projected from the relieved portion 40 of nozzle block 18. Note how the slot formed by relieved portions 40 and conduits or passages formed by channels 48, 48' join at 40 and 40" respectively.

In FIGURE 8 is shown a fragment of a modified form 15A of the primary bubble extracting unit 15 which is like the unit 15 in all respects except that the main conduit 23 comparable to conduit 14 is fluted on the inside as at 33 to provide greater inside conduit surface. This increases skin friction between the liquid and the main conduit which improves the bubble concentration in the center of the conduit 23, improving the efficiency of bubble concentration entering bubble take-off tube 43, similar to tube 28.

In the utilization of the foregoing structure, it has been noted that if the inner bubble take-off tube such as 28 or 45 is not concentric with its outer tube (14 in the case of tube 28 or the conduit formed by channels 37 in the case of tube 41) the structure is less efficient in removing the entrained bubbles from the entire liquid flow through the main conduit. Eccentricity of even several thousandths of an inch, for example, will reduce noticeably the efficiency of the bubble take-off tubes 28, 41, 41' and 43. Furthermore, particularly in the case of the nozzle means 18, this may be a problem because in operation there should be a balance between the choke screw 46 and the choke screw 46'. With a slight eccentricity of either of the tubes 41 and 41', it is necessary to have the choke controls opened farther than otherwise would be necessary, since the two controls should be opened about the same amount in order to balance the flow of material. The less efficient one must be opened substantially farther than the more efficient one would need to be in order to actually remove all of the entrained air bubbles, but to retain balance both must be opened excessively compared to optimum conditions.

While a single separating structure such as that designated 15 will remove a very high percentage of the entrained bubbles in the liquid, it does not remove the desired amount of them without removing at the same time a high percentage of material that could be useful as bubble-free liquid.

According to the best of our knowledge and belief, there are three variables which are the principal ones to take into consideration when designing or constructing a separating apparatus as described herein. The first is the viscosity of the fluid being used. In viscosities having a centipoise value of 5000 (hereafter abbreviated cp.) or more, conventional de-bubbling apparatus is not very effective and entrained gas and liquid vapor bubbles will remain trapped and substantially immovable in the fluid for a long period of time. Conventional de-bubbling structures are necessarily very large and cumbersome even when de-bubbling liquids of viscosity as low as 2000 cp. When using the bubble extracting structure described herein, fluids of known viscosity of 20,000 cp. have been readily projected and recycled as visually clear films and similarly with fluids of viscosity estimated as high as 50,000 cp.

The second major variable to consider is the size of the take-off tube in the conduit carrying the fluid from which the entrained gas bubbles are to be removed. In general, the more viscous the fluid, the smaller the separating or take-off tube may be and still get effective removal. Generally also, the larger the take-off tube the more complete is the separation achieved. Practically the take-off tube must be as small as possible consistent with effective separation. The range suggested by experiments to date is to have the inner or take-off tube of a diameter from ⅙ to ¾ of the main conduit diameter with ½ being a desirable ratio when dealing with high viscosity fluids, i.e. 5000 cp. and up. In terms of capacity or tube cross section area, if it is preferred to use tubes of other than cylindrical form, the range is 1/36 to 9/16.

We believe that velocity of the fluid is the third major factor controlling the efficiency of velocity gradient separation, since the greater the velocity the more pronounced the difference between the rate of flow of liquid at the center of the conduit and the flow adjacent the wall of the conduit. At the wall, the velocity is substantially zero. It is desirable to have the difference in velocity or the velocity gradient change as rapidly as possible from the wall surface to the center of the conduit. The velocity gradient will vary more rapidly as the average velocity of the material flowing in the conduit adjacent the take-off tube increases. When dealing with liquids having a viscosity of from 2000 to 20,000 cp. a velocity in the range of 300 to 450 feet per minute is adequate to produce substantially total visual separation in two stages when the take-off tube is ½ the diameter of the conduit. Liquids of lower viscosity would require greater velocities and/or larger take-off tubes. The use to which material is to be put controls the viscosity, and in coating, the viscosity ranges from 2000 cp. when using the technique described and shown in FIGURES 4, 5 and 6, where a board and a fairly flat object are being covered, to a film having a viscosity of at least 10,000 cp. when encapsulating objects as shown in FIGURE 9.

This method of separating discrete portions of immiscible matter, such as bubbles of gas, from a liquid has the same offset as increasing the specific gravity of the liquid in which the matter is entrained. At the same time, the specific gravity of the immiscible matter is not affected. Accordingly, there is an increased tendency of the entrained matter to move toward the low pressure area in the structure of this invention as compared to movement toward the surface of the same liquid in a gravity settling tank. In a specific example, where liquid of 2000 cp. viscosity was pumped at the rate of 7 gallons per minute through a tube having a diameter of ⅝ of an inch, it was calculated that the average velocity was 438 feet per minute. Velocity at the outside of the tube is zero and at the center of the tube twice average velocity or 876 feet per minute. The difference in velocity between the center of the tube and its edge, only 5/16 of an inch distant, is thus 876 feet per minute. This velocity in this size tube acting on a liquid of this viscosity was further calculated to have the same effect as increasing the density of the liquid at least 127 times. Theoretically the increase may be greater than 127 times, and the figure 127 was used to be conservative. It can be said, then, that bumbbles of gas or other immiscible mater entrained in the liquid would have 127 times greater force applied moving them toward the low pressure portion of the liquid than in the same liquid in a gravity settling tank. Another way of stating the same thing is that for a given settling tank, liquid of the same viscosity would have to have a specific gravity 127 times as great to produce the same separating action. When the effective or artificial specific gravity of the liquid is increased by a factor as great as this, natural gravity has relatively small effect on the discrete matter, such as gas bubbles, being separated so that the system will operate satisfactorily in any attitude. Theoretically, however, most effective action will occur when the separation takes place in a vertical direction so that gravity has zero effect as far as the movement of the entrained immiscible matter through the liquid is concerned. While the structure was evolved to separate entrained gas bubbles from liquids, the rate of pressure change per unit of distance of the liquid is so tremendously enhanced by this technique that it is envisioned as a means for separating matter that is heavier than the liquid by inducting it to move to the center of the rapidly flowing liquid in which immiscible matter is entrained. It appears that almost any matter which is immiscible in the liquid can be separated, if the viscosity and speed of the liquid and size of the take-off tube are adequate with respect to the discrete pieces or bubbles which are to be removed.

When constructing units for separating air bubbles from liquids used in the packaging techniques described herein, unit 15 is so constructed and arranged that the outside diameter of the bubble take-off tube 28 is from 1/16 to ¾ and preferably approximately ½ the inside diameter of the main flow conduit 14. Experience so far shows that more viscous liquids can employ a smaller tube and less viscous a larger one. It is estimated from visual inspection that with the illustrated arrangement of tube diameters, an average velocity range of about 300 to 450 feet per minute, a viscosity in the range of 2000 to 20,000 cp., and a very sharp cut-off edge 30 provided by the internal chamfer 29, the flow control member 35 may be adjusted to take-off between 15 and 95 percent of the entrained bubbles in molten plastic without sacrificing excessive quantities of material that might be useful as clear liquid film forming substance. The second stage of the device is similarly effective in removing 85–96 percent of the remaining entrained bubbles. For purposes of illustration, a hypothetical example in which each of the bubble extracting units remove 90 percent of the entrained bubbles would leave a tool of 1 perecnt of the original bubbles in the final film.

As a practical matter, however, the film that finally emerges from the nozzle slot 40 is visually free of bubbles. Furthermore, by turning the choke screws 35, 36 and 46' in, the bubbles may be made to appear in the film, and by backing off the control members 35, 36 and 36', the bubbles may be made to disappear from the film or curtain 25.

It is also important to note that while the tubes 28, 41 and 41' could be chamfered on the outside as well as the inside and still produce a sharply defined edge for separating the material with entrained bubbles and that which has none, to place the chamfer on the outside might introduce turbulence and bubbles into the otherwise smoothly flowing material that is substantially free from bubbles. It is considered preferable, therefore, to have the chamfer an internal one rather than an external one. For the same reason, bending of conduit 14 near tube 28 or placing any structure within conduit 14 except tube 28 should be avoided to the extent possible. In fact, any substantial bending or imposition in the conduit of turbulence producing structure may destroy the bubble removing capacity of the structure at least in the sense of producing bubble-free liquid.

While all of the bubble removal from the film or curtain material could be accomplished prior to supplying it to nozzle slot 40, it is possible to remove at least part of the material having entrained bubbles at the nozzle itself use the bubble containing material as a stabilizing column at each margin of the film or curtain 25. Even with these columns of bubbles helping to hold the curtain edge from drawing together, the edges of the curtain or film slant inwardly slightly. This is a natural result of the molten material tending to contract under the influence of surface tension and cooling. This contracting of the film both reduces the width of the curtain the farther it gets from nozzle slot 40 and causes it to thicken.

If curtain film 25 were projected from nozzle 40 without the latter being in contact with the bubble columns, it would contract or diverge inwardly at the edges substantially as shown by the broken lines 50. However, when the film is projected to contact with the columns of material having entrained air, the contracting tendency is counteracted in part. The columns are substantially thicker in section than the film and also are cylindrical in pattern. For these reasons, surface tension in the liquid columns will only reduce the diameter of the cylindrical formation, and the columns tend to project straight downwardly. Being in contact with the edge of the curtain, they tend to hold the curtain in a stretched condition and produce a double desired effect. In the first place, they increase the breadth of the usable portion of the curtain substantially and in the second place they tend to retain the curtain at a uniform thickness throughout its useful projection. Thus, the entrained air bubble separating structure at the nozzle itself serves the dual important functions of extracting the last traces of air bubbles from the curtain material and at the same time provide a curtain with stabilizing column at each marginal edge. Ball type chains have also been found to produce the same result if secured at the ends of the nozzle slot 40. These balls act on film 25 in exactly the same way that bubble columns 26 do.

Reference to FIGURES 5 and 6, in cooperation with FIGURE 4, illustrates an article being coated by the foregoing structure. In those figures, and particularly in FIGURE 4 in the first instance, an object 51 such as any suitable piece of merchandise to be packaged is shown lying on a treated backing card 52 to which the film will adhere, which serves as a support for the object and which also may contain advertising and sales material. The treatment applied to the board to permit adherence of the molten plastic forms no part of this invention per se, hence need not be described here. The speeds of operation of belts 20 and 21 are within the range of ½ to 6 times the rate of flow of the film 19 being projected by the nozzle block 18.

As shown in FIGURE 5, the conveyor 20 has projected the object 51 well into the film or curtain 25 which is shown extending over the card 52 in the front of the object 51. As illustrated here, it appears to be a film covering the object in only two dimensions. In actual fact, of course, the material flows over the sides of the object 51 and engages the card on the marginal edges, as shown at the front of the card 52 (see also FIGURE 7). In FIGURE 6, the initial object 51 and its card 52 have been projected entirely through curtain 25 and is covered with a film consisting of a portion of curtain 25 and designated 25F. At the same instant, a second object 51' is about to be projected on its card 52' into the curtain 25. Between objects and also at the marginal edges of any object will be excess curtain material and the bubble columns 26 which of course fall into and are caught by return trough 22. Pipe 24 conducts material in trough 22 back to reservoir 10.

When a structure such as that illustrated here is used in conjunction with material such as polyethylene, which must be heated to a relatively high temperature in order to remain in a molten state, the entire mechanism or desired portions thereof are heated by means of any suitable heating structure such as jacketing 53 surrounding all of the structure except return tube 16 which has a heating pipe 53' connected into the main jacket 53 through which heated liquid is pumped via an inlet 54 and an outlet 54'. Thus a suitable heating arrangement for the circuit is provided to keep resin in it in a liquid state. As the heating structure may be conventional, it is neither shown nor described in more detail, since it forms no part of this invention per se.

In FIGURE 9 is seen a portion of the nozzle 55 substantially identical to nozzle 18, discharging a film or curtain 56 through which an object such as a pen represented at 57 is projected by suitable structure, or by hand. The projection is in the direction shown by the large arrow and the orientation of the pen 57 to the film 56 is endwise. As the pen is projected through the curtain as by being propelled from any suitable conveyor and allowed a free fall through the curtain generally in the direction of the arrow, the pen is completely encapsulated by the falling curtain and comes out as seen at the left where film 58 forms a seamless, unbroken sheath around the pen. This type of packaging requires a film curtain of considerable strength and requires a material having a viscosity of 10,000 cp. or more. The speed of the pen through the curtain is preferably within the range of ½ to 6 times the linear fall of the curtain though experiments suggest that higher speeds may be acceptable with stronger films than those presently available.

The invention has been described in detail with particular reference to preferred embodiments thereof, but it will be understood that variations and modifications can be effected within the spirit and scope of the invention.

What is claimed:

1. A structure for coating objects with a substantially bubble-free film comprising, a reservoir, a pump, a conduit communicating between said reservoir and said pump, a bubble removing structure, a conduit communicating between said bubble removing structure and said pump, a nozzle comprising a block member, an upper channel in the block member, a conduit communicating between said bubble removing structure and said upper channel of said block member, a lower channel in said block member, vertical channels near the ends of said block member interconnecting said upper and lower channels, a thin continuous passageway communicating between the lower edge of said block member and said lower channel, vertical chambers extending from the upper inside of said block member to the ends of said thin passageway, tube means smaller than said upper channel extending from said vertical chambers into said upper channel and beyond said vertical channels and substantially concentrically into the ends of said upper channel, passageways in said block member communicating between said tubes and said vertical chambers, a pair of spaced conveyors arranged on either side of said nozzle with a space between them directly below said nozzle, a catch basin below the space between said conveyor means, and a conduit communicating between said catch basin and said reservoir.

2. The structure of claim 1 further comprising means on said structure for heating said reservoir, conduits, bubble removing structure and catch basin.

References Cited

UNITED STATES PATENTS 3,074,374    1/1963    Burkle _____ 118—32

FOREIGN PATENTS 814,010    12/1962    Great Britain.

WALTER A. SCHEEL, Primary Examiner

JOHN P. McINTOSH, Assistant Examiner

U.S. Cl. X.R.

118—302, 324, 603